3,308,686
TWO SPEED PLANETARY GEAR AUXILIARY RANGE TRANSMISSION
Alfred Magg, Friedrichshafen, and Peter Angerer, Ailingen, Germany, assignors to Zahnradfabrik Friedrichshafen, Aktiengesellschaft, Friedrichshafen, Germany
Filed Sept. 4, 1964, Ser. No. 394,523
Claims priority, application Germany, Sept. 10, 1963, Z 10,346
11 Claims. (Cl 74—752)

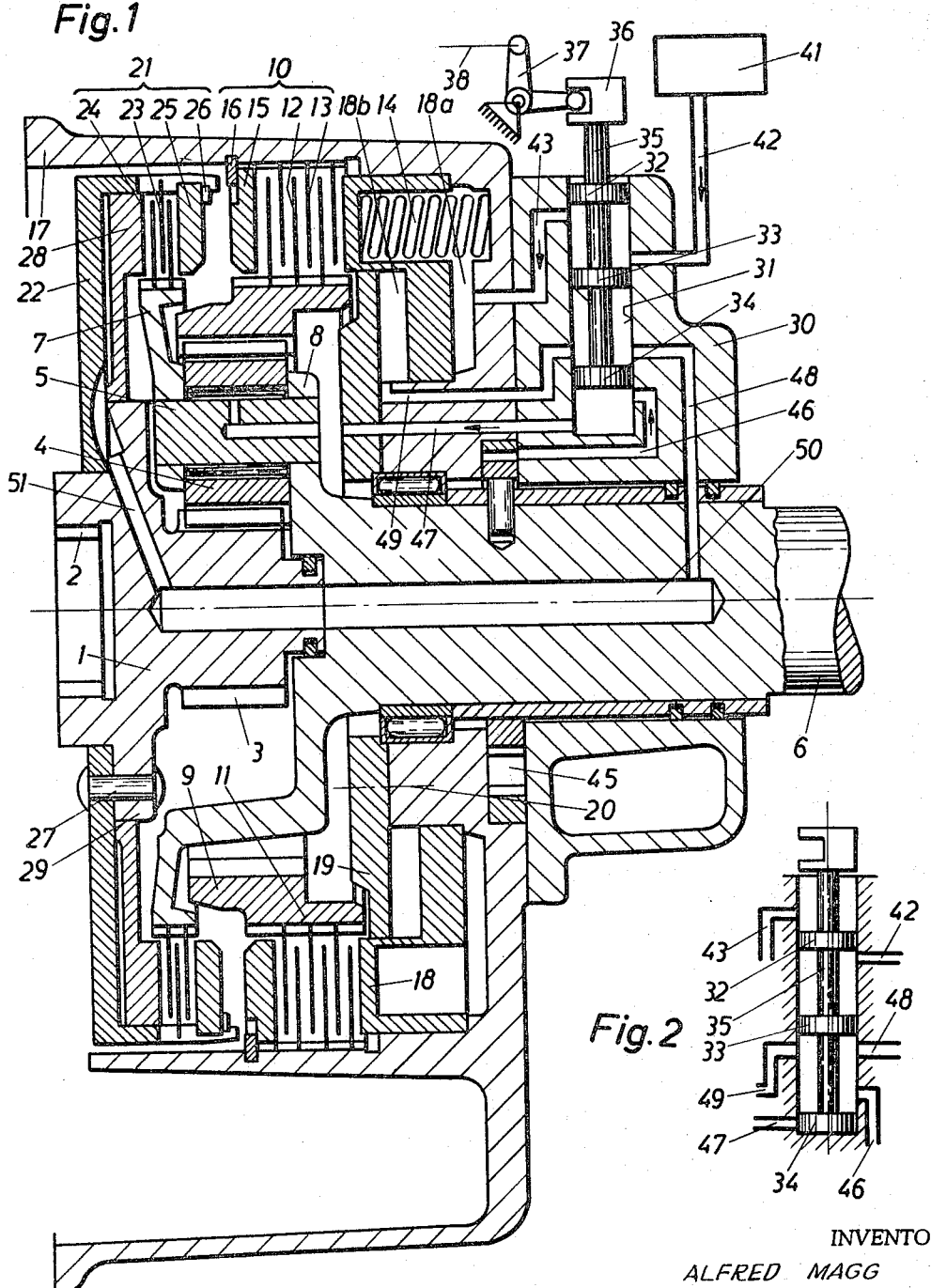

This invention relates to automotive transmissions and more particularly to an auxiliary range transmission to be used in conjunction with the main transmission for the purpose of effecting speed reduction or direct drive therethrough, primarily for trucks.

The prior art discloses planetary gear or auxiliary range transmissions to effect a reduced speed.

Some prior art auxiliary transmissions are shifted by means of separate manually operable levers, an arrangement which requires prolonging of the shifting process and which is undesirable from the standpoint of traffic safety. Other prior art constructions disclose a single manually operable lever for the main and auxiliary transmissions whereby the coupling of such transmissions is effected by positive drive, causing an interruption of torque during shifting or gear selection.

It is an object of the present invention to overcome the drawbacks of the prior art by utilizing a single manually operable lever for both the main and auxiliary transmissions without power interruption while the vehicle is under load. Other objects and features of the invention will be apparent in the disclosure to follow.

The main object of the invention is brought about by the use of a planetary gear controlled by frictionally engageable components such as a clutch, a brake and a combination of pressure devices such as compressed air, pressure oil, and springs. Thus, oil pressure and compressed air are usually present in truck vehicles although the present invention provides for an oil pump in the construction. The arrangement is such that when the invention has been manually set to run the vehicle at reduced speed, direct drive is effected upon speed pickup, automatically, as a result of pressure buildup in the pump which is run directly from the main transmission shaft. In the drawing:

FIG. 1 is a cross sectional longitudinal elevation of the invention showing the arrangement of the planetary gear device in its normal condition with the ring gear braked to effect a speed reduction; and FIG. 2 is a fragmentary portion of FIG. 1 showing the valve moved to a position for effecting direct drive of the system.

Referring now to the drawing an input shaft 1 is shown, which will be understood to be coupled by splines 2. Shaft 1 carries a sun gear 3 which meshes with planetary gears such as 4 which mesh in turn with a ring gear 9. The planet gears 4 are carried on respective shafts 5 secured in spaced flanges 7 and 8 integral with an output shaft 6. The ring gear 9 is centered by means of its support on the planet gears 4 and has a collar 11 for support of frictional brake discs 12 splined thereto and alternating with frictional brake discs 13 splined to the housing 17 in a well understood manner. A thrust supporting plate 15 is carried in the housing backed by a retaining ring 16. Thus, the disc packets 12 and 14 form a friction brake 10 and such brake is maintained in engaged condition by compressed air within a chamber 18A and acting against a piston 18. Such compressed air is supplied by a compressed air tank 41 which is usually part of the vehicle.

The compressed air force on piston 18 is approximately 50% of the force utilized for maintaining brake 10 closed, the remaining 50% of force being provided by a series of springs such as 14 which are in compressive stress intermediate respective sockets in the piston 18 and the radial flange of the housing 17.

The chamber 18B forms an oil pressure chamber acting against the piston 18 enclosed at its opposite side by a plate 19 fastened in a suitable manner to the inwardly extending collar 20. Oil pressure control is effected in a manner to be hereinafter explained. It will be understood at this point, however, that due to the normal closure of the brake 10, ring gear 9 is maintained braked and there will, therefore, be a reduced speed drive from shaft 1 to shaft 6 due to the effect of the planetary gearing in a well understood manner.

As a matter of construction the flange 7 has the same outer diameter as the collar 11, for ease of assembly of the disc packets 10 and 13 and also of the discs 24 which are slidably splined to the periphery of flange 7 forming a packet for coaction with disc 23 to effect a frictional clutch 21, having a thrust support plate 25 secured to the fingers which carry disc 23. A retainer ring 26 holds plate 25 in position and the aforementioned fingers extend longitudinally from drum 22 which is secured as by rivets 27 to a radial flange 29 of input shaft 1.

Slidably carried on the periphery of the flange 29 is a piston 28 whose periphery has slidable seating coaction with the inner surface of the peripheral skirt of the drum 22.

The chamber formed between the radial wall of drum 22 and piston 28 can be provided with oil pressure via a bore 50 which connects with a passage 51 leading to a hollowed out portion of the inner radial face of drum 22 to complete a passage into the aforementioned chamber for pressure oil from channel 48 which feeds the bore 50.

Pressure oil is controlled by means of a piston valve within a bore 31 machined into a cover member 30 secured in any suitable manner to the housing 17 at the rear face. Such valve comprises pistons 32, 33 and 34 carried on a rod 35 which is secured by a clevis 36 to a bell crank lever 37 actuated by an operating member 38 which will be understood to be connected to the manual shift control system of the main transmission. Thus, when lever 37 is rocked by the manually operated lever (not shown) which effects gear shift of the main transmission, the valve is actuated from the position shown in FIG. 1 to the position shown in FIG. 2 wherein it will be noted that the valve pistons are in upper position in FIG. 1 with respect to passages 42, 43, and 46–49 connecting to the valve bore 31.

Oil pressure is provided by a pump 45 of conventional rotary construction having its rotor keyed to output shaft 6 and in the position shown for the value in FIG. 1 the pump outlet line 46 communicates with the passage 47 which effects lubricating feed to the planetary gearing and other rotary parts of the mechanism as will be understood from consideration of FIG. 1.

Assuming the valve in the position of FIG. 1 the normally closed position of brake 10, as has been previously mentioned, effects speed reduction of output shaft 6. If, however, the shift lever of the main transmission is actuated then the valve pistons are actuated to the positions shown in FIG. 2, which shuts off the compressed air feed from conduit 42 to conduit 43 thereby cutting off air pressure force in chamber 18A acting against piston 18. At the same time pressure oil then communicates from passage 46 through the valve bore through the passage 49 into chamber 18B forcing piston 18 to the right against the bias of springs 14 releasing the brake 10. It will be noted that bore 31 is open at the top to release any air trapped under compression in chamber 18A and accordingly oil pressure need overcome only the bias of the springs. Thus, the ring gear 9 is released and can rotate without transmitting torque.

Simultaneously with the above described action, oil pressure connects from bore 46 to bore 48 and thence through bores 50 and 51 to the left side of piston 28 whence engagement of clutch 21 is effected. This provides direct frictional coupling via the clutch for the input shaft 1 and output shaft 6. Accordingly, direct drive through the auxiliary transmission is thus effected for as long as the valve pistons remain in the position shown in FIG. 2.

When, however, the vehicle is operating at reduced speed, the condition shown in FIG. 1, automatic direct drive connection will be established upon only speeding up of the vehicle. Thus, the pressure of pump 45 increases to a point that operation of the pistons 18 and 28 occur. Accordingly, with the valve in the position shown in FIG. 2 the vehicle will continue at reduced speed until road conditions are such that sufficient speed is attained to provide the required degree of pressure for the auxiliary transmission to go automatically into direct drive.

It will be noted that the transition from reduced speed to direct drive is accomplished without any interruptions in torque transmission by virtue of the use of the friction clutch and brake. Likewise, in going into a reduced speed there is no interruption of power for the same reason.

The valve vents compressed air from the chamber 18A whereby the bias of springs 14 is all that maintains the brake 10 engaged. Accordingly, oil pressure in chamber 18B need only be sufficient to overcome spring bias.

The arrangement is such that the pressure of the pump builds up so as to become operative on the pistons 18 and 28 just before the vehicle reaches a point at which shift to the next higher speed of the main transmission is in order. Accordingly, even though the valve may be actuated to the position shown in FIG. 2 for direct drive through clutch 21, such direct drive will actually not take place until a predetermined speed of output shaft 6 is effected, at which time the vehicle has reached a suitable speed.

Having thus described the invention, it is apparent that changes may be made without departing from the spirit thereof and accordingly, it is not sought to restrict the invention to the precise illustrations herein given except as set forth in the following claims.

We claim:

1. A speed reducing and direct drive auxiliary transmission for use in conjunction with a main transmission, comprising an input shaft to be driven by the main transmission, an output shaft coaxial with said input shaft for driving a vehicle, a planetary gear system having planetary gears for driving said output shaft, a sun gear on said input shaft meshing with said planetary gears, and a ring gear, frictional brake means operative to effect braking of said ring gear responsive to predetermined low speed of said output shaft to maintain a reduced speed drive for said vehicle, and frictional clutch means for frictionally coupling said input shaft to said output shaft responsive to a predetermined increase of speed of said output shaft, wherein said brake and clutch means comprise pressure operated devices, and control means comprising pump means communicating with said brake means and responsive to speed of said output shaft for effecting pressure to release said brake means and to engage said clutch means upon output pressure increase of said pump means at said predetermined increase of speed of said output shaft, and brake engagement means comprising pneumatic pressure means operatively connected to maintain said brake means normally engaged.

2. A speed reducing and direct drive auxiliary transmission comprising input and output shafts, a planetary gear device having an element connected to said output shaft and an element connected to said input shaft, a pressure operated friction clutch disposed to couple said shafts for direct drive, said planetary gear arrangement having another element and a pressure operated friction brake disposed upon closing to brake said other element to effect reduced speed drive from said input to said output shaft through said planetary gear device, bias means for biasing said brake means to closed condition, and means responsive to speed of said output shaft for overcoming said bias to disengage said brake means and to effect simultaneous engagement of said clutch whereby direct drive from said input to said output shaft is effected, said bias means comprising a piston and means providing a bias pressure chamber on one face thereof, said bias means comprising a source of compressed air and means for conducting said compressed air to said bias chamber, said bias mean further comprising spring means disposed to move said piston in the direction of bias to effect additional bias force, means providing an oil pressure chamber on the other side of said piston, a source of oil pressure comprising a pump operated by said output shaft, valve means for venting air from said bias chamber and conducting oil pressure to said oil pressure chamber, whereby upon predetermined speed of said output shaft said pump effects an output pressure sufficient to overcome the bias of said spring means to release said brake means.

3. A transmission as set forth in claim 2, a piston disposed to engage said friction clutch to effect said direct drive and means providing a chamber for said latter piston and means connecting said latter chamber to said pump to effect clutch engagement by pressure upon said piston.

4. A speed reducing and direct drive auxiliary transmission comprising an input shaft and an output shaft, a speed reduction device, fluid pressure operable friction clutch means for coupling said shafts for direct drive, control means comprising a fluid pressure actuated device for rendering said speed reduction device operative to connect said shafts for reduced speed drive of said output shaft, and a pressure source having an outlet pressure proportional to the speed of said output shaft, bias means for biasing said fluid pressure actuated device to effect said reduced speed drive, valve means for diverting said outlet pressure to overcome said bias and to simultaneously engage said clutch means to effect direct drive, said bias being thus overcome when said outlet pressure reaches a predetermined degree responsive to the speed of said output shaft, said speed reduction device comprising a planetary gear arrangement having a sun gear connected to said input shaft, said output shaft having a pair of longitudinally spaced flanges, planet gears carried intermediate said flanges, clutch means having discs carried on one of said flanges, a ring gear surrounding said planet gears and having a radius of substantially the same as that of said one flange, said fluid pressure actuated device comprising a friction brake means having dics carried on said ring gear and being operative upon engagement to brake said ring gear, said bias means comprising a piston disposed to effect engagement of said brake means, means providing a pressure chamber on each side of said piston, said valve means being connected to said chambers to direct pressure to one chamber to move said piston in biasing direction and to vent the other chamber, in one position of said valve means, and in another position of said valve means to vent said bias pressure and to effect opening pressure for said brake means.

5. A speed reducing and direct drive auxiliary transmission as set forth in claim 1, said brake engagement means further comprising spring bias means.

6. A speed reducing and direct drive auxiliary transmission as set forth in claim 1, said control means also comprising a valve and a manual operated means for said valve whereby said valve may be operated to actute said clutch means and said brake means for actuation of said clutch means and brake means only when said pump means attains said predetermined actuating pressure.

7. A speed reducing and direct drive auxiliary transmission as set forth in claim 1, said brake engagement means further comprising spring means, wherein said spring means and said pneumatic means coact to effect said brake means being normally engaged.

8. A speed reducing and direct drive auxiliary transmission as set forth in claim 4, said bias means comprising a piston disposed to effect engagement of said brake means, means providing a pressure chamber on each side of said piston, said valve means being connected to said chambers to direct pressure to one chamber to move said piston in biasing direction and to vent the other chamber, in one position of said valve means, and in another position of said valve means to vent said bias pressure and to effect opening pressure for said brake means, said bias means also comprising spring means.

9. A speed reducing auxiliary transmission comprising a reduction gearing and control means therefor comprising a pair of fluid actuated systems operative to effect a condition change of said gearing from a slower to a higher speed of transmission, each such system comprising actuatably engageable control members, a hydraulic pressure source means operatively connected to effect actuation of the members of either of said systems, and means comprising a source of pneumatic pressure for maintaining normal engagement of the members in one of said systems.

10. A transmission as set forth in claim 9, said engageable members comprising a frictional clutch and a frictional brake, wherein said means comprising a source of pneumatic pressure and also comprises a spring bias means coacting with pneumatic pressure for maintaining said normal engagement.

11. A transmission as set forth in claim 9, said engageable members comprising a frictional clutch and a frictional brake.

References Cited by the Examiner
UNITED STATES PATENTS

| | | | |
|---|---|---|---|
| 2,204,872 | 6/1940 | Thompson | 74—752 X |
| 2,221,393 | 11/1940 | Carnegie | 74—752 X |
| 2,223,716 | 12/1940 | Bojesen | 74—752 X |
| 2,464,975 | 3/1949 | Gibbs | 192—85 |
| 2,806,567 | 9/1957 | Bonquet | 192—86 X |
| 2,895,344 | 7/1959 | Holdemann et al. | 74—752 |

DAVID J. WILLIAMOWSKY, *Primary Examiner.*

J. R. BENEFIEL, *Assistant Examiner.*